United States Patent [19]

Fedak et al.

[11] Patent Number: 4,555,802
[45] Date of Patent: Nov. 26, 1985

[54] COMPACTION AND DECOMPACTION OF NON-CODED INFORMATION BEARING SIGNALS

[75] Inventors: John F. Fedak; Gerald I. Findley; Terry A. Torr, all of Tucson, Ariz.

[73] Assignee: International Business Machines Corporation, Armonk, N.Y.

[21] Appl. No.: 456,920

[22] Filed: Jan. 10, 1983

[51] Int. Cl.⁴ .......................... G06K 9/00; H04N 7/12
[52] U.S. Cl. ........................................ 382/56; 340/703; 340/728; 358/260; 358/263; 358/283; 364/900
[58] Field of Search ................ 382/56; 340/703, 724, 340/728, 750, 751, 794, 800; 358/260, 261, 263, 283; 364/518, 521, 526, 900 MS File

[56] References Cited

U.S. PATENT DOCUMENTS

| | | | |
|---|---|---|---|
| 3,681,650 | 8/1972 | Hell | 358/283 |
| 3,921,135 | 11/1975 | Komaru et al. | 382/56 |
| 4,000,486 | 12/1976 | Schomburg | 340/728 |
| 4,031,519 | 6/1977 | Findley | 364/900 |
| 4,071,855 | 1/1978 | Wilmer | 358/260 |
| 4,084,259 | 4/1978 | Cahill et al. | 364/900 |
| 4,205,341 | 5/1980 | Mitsuya et al. | 358/283 |
| 4,210,936 | 7/1980 | Cinque et al. | 358/283 |
| 4,233,601 | 11/1980 | Hankins et al. | 340/703 |
| 4,238,768 | 12/1980 | Mitsuya et al. | 364/900 |
| 4,364,024 | 12/1982 | Paetsch | 358/260 |
| 4,365,273 | 12/1982 | Yamada et al. | 382/56 |
| 4,366,505 | 12/1982 | Tsuda et al. | 358/260 |
| 4,467,363 | 8/1984 | Tench, Jr. | 358/263 |

OTHER PUBLICATIONS

J. F. Fedak et al., "Advanced Function Printing with Efficient Storage Utilization", IBM TDB vol. 25, No. 3B, Aug. 1982, pp. 1650-1651.
J. A. Hall, "Laser Printing Systems Architecture", HP Systems Journal, Jun. 1982, pp. 8-9.
Anastassiou et al., "High Performance Gray-Scale Compression", IBM Technical Disclosure Bulletin, vol. 24, No. 9, Feb. 1982, pp. 4513-4516.
Stucki, "Optimal Digital Halftone Pattern Generation Method", IBM Technical Disclosure Bulletin, vol. 17, No. 9, Feb. 1975, pp. 2779-2780.

*Primary Examiner*—Leo H. Boudreau
*Attorney, Agent, or Firm*—H. F. Somermeyer

[57] ABSTRACT

Image or character data in the form of a rectangular array of binary 1s and 0s (bits) are divided into a plurality of segments, such as thirty-two by thirty-two bit segments or one bit by eight bit or byte segments. The image data is scanned for identifying all-zero segments (background) which are ignored and non-zero segments (foreground) which are transmitted or stored with offset and length (number of successive non-zero segments). The compacted image data is suitably indexed for facilitating image expansion using simple techniques. All compaction and decompaction machine operations are independent of bit-significant informational content of the segments. Presentation of the uncompacted data uses any printer or display type of device.

13 Claims, 7 Drawing Figures

COMPACTION AND DECOMPACTION OF NON-CODED INFORMATION BEARING SIGNALS

DOCUMENT INCORPORATED BY REFERENCE

An image-presentation device with which the present invention may be advantageously employed is shown in U.S. Pat. No. 4,031,519 an electrophotographic laser-type printer.

FIELD OF THE INVENTION

Present invention relates to compaction and decompaction of information-bearing signals, more particularly to those information-bearing signals arranged in rectangular arrays or rasters for representing images of all types, such as pictures, characters, symbols and the like.

DESCRIPTION OF THE PRIOR ART

Compaction and decompaction of information-bearing signals of the digital signal type has been practiced for many years. In particular, in communications systems compaction of data follows so-called run-length coding wherein strings of binary one signals and strings of binary zero signals are represented by specially coded characters in a manner for reducing the total number of signals transmitted. Such compaction and decompaction requires a thorough analysis at the bit level of the data signal patterns being compacted and therefore requires substantial computer power or, in the alternative, substantial computing time. It is desired for image display or printing that a good compaction ratio be provided that does not require a lot of computer power for the compaction and decompaction processing. That is, it is desired that each bit in the raster pattern array of digital signals not be examined in conjunction with adjacent signals for the purposes of encoding in the manner that run-length coding requires for compaction.

The IBM Technical Disclosure Bulletin article by Bliss, et al, entitled "Character Code to Dot Video Converter", March 1971 at pp. 14, 15, describes an image compaction method for converting character-code information to a digitized representation. This conversion allows character information to be displayed on a CRT (cathode ray tube) display. This reference does not show elimination of background or so-called white space nor handling signals other than examining all bits in an image a bit at a time.

U.S. Pat. No. 4,207,612 to Grier, et al shows a video display of alphanumeric characters. The white spaces between the lines of a printed page are compressed. This compression method can also be used with a dot matrix printer. The compression method is generally not applicable to pictures. U.S. Pat. No. 3,988,728 to Inoue relates to a graphic display device using a plurality of subrasters in a raster display. The purpose of subrasters is to facilitate movement or shifting within the display. While subrasters are shown, compaction or compression is not addressed. U.S. Pat. No. 4,000,486 to Schomburg shows a digital xerographic light beam or laser printer. The laser beam scans the entire width of the page and uses a data compression technique for optimizing storage of white spaces, such as margins. This patent discloses the use of "white space" indicating control codes in combination with a character generation control for reducing the size of data storage space required to store a page of text. While this data compression certainly enhances data storage utilization, it does not address the problem of eliminating background pels (print elements) from image-representing signals for reducing the size of data storage unit for storing a given image.

U.S. Pat. No. 3,634,828 to Myers, et al shows a control in a matrix printer for enabling printing graphics. The graphics are received as data blocks including binary information in the form of templates (subrasters). Templates are square having 16 printable dots on each dimension. Addressing techniques for accessing and manipulating the templates are disclosed. While this patent does show subrasters for standard templates, the purposes of the invention appear not to be related to conservation of data storage space through the use of data compaction or compression techniques.

COMMONLY ASSIGNED CO-PENDING APPLICATION

U.S. Ser. No. 364,061 filed Mar. 31, 1982, discloses a data compaction method and apparatus for compacting rasters of binary signals for ideographic and other symbols. The pattern for each ideographic symbol is divided into subarrays of bytes of binary signals (1 bit by 8 bits). The informational contents of each subarray is analyzed at the bit significant level. When a succession of adjacent bytes have the same information content, then a compaction control combines all successively adjacent identical bytes for achieving compression of the raster pattern for conserving data storage space. The compaction technique is particularly useful for two-level (black on white or white on black) images such as found in ideographic symbols. It appears not to be as efficient for gradations of gray. Even though this latter reference shows an efficient compaction algorithm, it does require a bit-by-bit analysis of the informational content of the subarrays. It is desired to provide a compaction technique which is independent of the specific or entire informational contents of the data being compacted, i.e., avoid a detailed analyzing of informational contents of the data being compacted, such as analyzing data patterns within the graphics array.

DESCRIPTION OF THE INVENTION

The invention contemplates a method and apparatus for digitally processing image-representing data signals received as a rectangular raster array of binary signals wherein each of the signals can be addressed in a horizontal and vertical coordinate system. The array is automatically divided into a plurality of array segments, each of the segments preferably being square, such as thirty-two signals on a side, no limitation thereto intended. The segments are analyzed to the extent that the segment contains only all-background (for example, binary zero) signals which are then ignored. Any segment containing at least one foreground image-datum-representing signal will be stored. Successively scanned segments having at least one datum representing signal and independent of the informational content thereof are stored as addressable groups of segments. The groups of segments are stored in a suitable data storage unit with directories indicating the storage location of each group as well as the spatial locations of the digital signals of the stored groups with respect to the received rectangular raster array of signals. For visually presenting the image, the data storage unit supplies the stored segments, while the directories indicate where in the visually-presented image the readout signals are to be supplied for re-creating the image without storage of any background-only-indicating segments of signals.

In an all-points-addressable-raster-type image presentation device, such as one using a cathode ray tube, dot matrix printer, and the like, the image presentation device is controlled by a digital processor. The digital processor has a working store with a plurality of addressable registers which are allocatable for program-defined data storage. A text decoder couples a raster pattern store and the working store to a print buffer (which is cleared on each cycle of the image presentation unit) for transferring electrical signals to the image-presentation device under coordinated control of the digital processor. The working store includes a line-index table for relating horizontal lines of the raster to predetermined data storage areas of the working store. An offset table, also in the working store, occupies the predetermined data storage area for storing line offsets for the data to be printed, and the number of data units (segments) to be printed as well as the address within the raster pattern store which stores such segments to be printed. Means are provided for linking the predetermined data storage areas within each line identified in the line index table. A so-called "blank" array, also in the working store, has a plurality of addressable bit storing positions, each bit position for storing a first binary signal or a second binary signal which respectively indicates that a corresponding data segment has all background-indicating signals or at least one foreground-indicating signal. Program means in the working store enables the digital processor to operate the elements of the image presentation device to receive a rectangular array of raster-representing digital signals, to divide the raster-indicating digital signals into segments having a given number of said raster digital signals and to relate each segment to a respective one of the blank array bits. Further program means in a working store enables a digital processor to scan each of the received segments for setting the related blank array bit store to a first or second binary signal in accordance respectively with whether the corresponding segment contains all background data or includes at least one foreground datum signal. Further program means in the working store enables the digital processor to identify all of the segments in the line index table and the offset table that contain the foreground datum signal for storing such segments in the raster pattern store as characters. Program means in the working store enables the digital processor to visually display the received rectangular array of raster signals by the coordinated operation of the image presentation device by supplying only the stored segments to said print buffer together with offsets indicated by the offset table.

The foregoing and other objects, features, and advantages of the invention will be apparent from the following more particular description of preferred embodiments of the invention, as illustrated in the accompanying drawings.

DETAILED DESCRIPTION OF THE DRAWINGS

Figure 1:
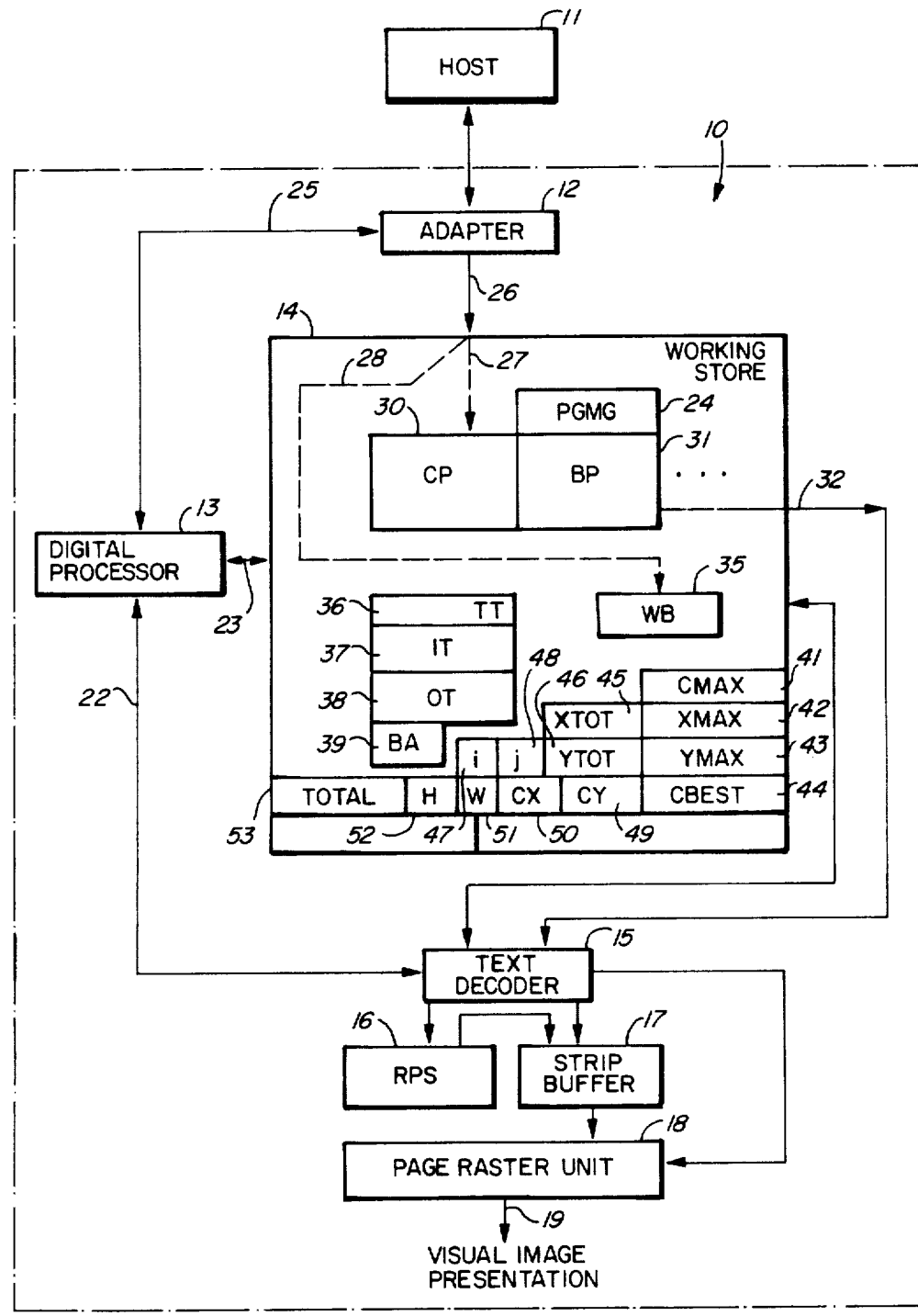
FIG. 1 is a block diagram of a printing system employing the teachings of the present invention.

Referring now more particularly to the drawings, like numbers indicate like parts and structural features in the various diagrams. In FIG. 1, image presentation system 10, shown as an electrophotographic printer in a preferred embodiment, is coupled to host processor 11 for receiving digital signals and commands for providing visual presentations of images represented by the received signals, such as at line 19. To achieve such visual presentations, host processor 11 communications with image presentation system 10 via an adapter 12 which is constructed in a usual manner for connecting to a host processor, such as an IBM central processing unit as is well known for IBM manufactured computers. A digital processor 13 within image presentation system 10 coordinates operations of all of the parts within system 10 for coordinated image presentation in accordance with the commands and image-representing signals received from host 11. Such signals may include representation of character symbols, such as alphanumeric symbols. Digital processor 13 (a general purpose processor of known design) is coupled to a working store 14 which contains its programming and parameter data siganls for use in image presentation system 10, as will become apparent. A text decoder circuit 15 controls the signal processing for converting the received image indicating digital signals to a form usable by page raster unit 18, such as a printhead on an electrophotographic printer as shown in the document incorporated by reference or other form of image presentation unit. RPS 16 is a raster pattern data storage unit which stores raster patterns of digital signals usable by the page raster unit 18 to create character symbols, for example. Under the control of text decoder 15, RPS 16 supplies the raster signals to a strip buffer 17 which accumulates the appropriate raster signals for use by page raster unit 18. Operation of elements 15, 16, 17 and 18 are in accordance with the document incorporated by reference.

Double-headed arrow 22 represents the electrical and logical connections between digital processor 13 and text decoder 15. Digital processor 13 supervises the operation of text decoder 15 for coordinating this operation with the working store 14 in accordance with the received signals from host processor 11 as is known in the printing arts. Double-headed arrow 23 represents the electrical and logical connections between digital processor 13 and working store 14, a usual random access memory. Working store 14 stores control programs PGMG 24 used by digital processor 13 to operate system 10. Double-headed arrow 25 represents the electrical and logical connections between adapter 12 and digital processor 13 for relaying commands received from host processor 11 to the digital processor 13, and for relaying other signals from digital processor 13 to host processor 11 as is usual in data processing systems. Adapter 12 also transfers the received image-indicating digital signals from host processor 11 over a set of connections, indicated by arrow 26, to working store 14. The received image-representing signals can be in two forms. A first form of image representation is coded information (CI) wherein an 8-byte) represents a raster pattern of a character symbol, such as the letter "A", and so forth. The coded information text is stored in working store 14 as represented by dashed line arrow 27, as current page CP 30. Previously received coded information text awaiting visual presentation by page raster unit 18 is termed buffer pages stored in area BP 31. The second form of image-representing digital signals received from host processor 11 are the so-called noncoded information (NCI) signals which are stored in a working buffer WB 35 portion of working store 14, as indicated by dashed line arrow 28. The coded information can include signals which address previously received noncoded information. The two types of information, coded and noncoded, are stored in separate areas of working store 14 because of the different type of processing required in image presentation system 10. It is to be understood that the NCI signals supplied as indicated by dashed line arrow 28 can include ideographs, as well as pictures, graphs and the like. The coded information texts stored in CP 30 and BP 31 are supplied to text decoder 15 as indicated by arrow 32 under the coordinated control of digital processor 13. Text decoder 15 responds to the coded information to address a raster pattern stored in RPS 16 for causing stored raster patterns to be fetched for printing a set of characters for a line or part of a line, for example, to be transferred to strip buffer 17 to await page raster unit 18 to access the signals for creating a visual image. The NCI patterns are accessed in a like manner, as will become apparent.

The present invention as practiced in image presentation system 10 is primarily concerned with NCI stored in working buffer WB 35. The following described elements of working store 14 relate to the subsequent descriptions of the invention as embodied in image presentation system 10. TT 36 is a translate table for translating received coded information text for converting that text to corresponding addresses for RPS 16 stored raster patterns to be identified via later-received coded information. TT 36 also stores a directory for accessing stored segments of the noncoded information compacted in accordance with the invention. IT 37 is a line index table used for pointing to offset table entities OT 38 which identify the spatial locations of raster patterns on a page being printed. BA 39 stores a blank array which indicates for each segment of the image being compacted whether or not all pels in corresponding image segments are background pels or if any one of such pels in the image segment is a foreground pel. BA 39 reduces processing time in practicing the present invention. CMAX 41, XMAX 42, YMAX 43, CBEST 44, XTOT 45, YTOT 46, i 47, j 48, cy 49, cx 50, w 51 and h 52 contain parameter data signals described later with respect to the machine operations employed in image presentation system 10 for practicing the present invention.

Figure 2:
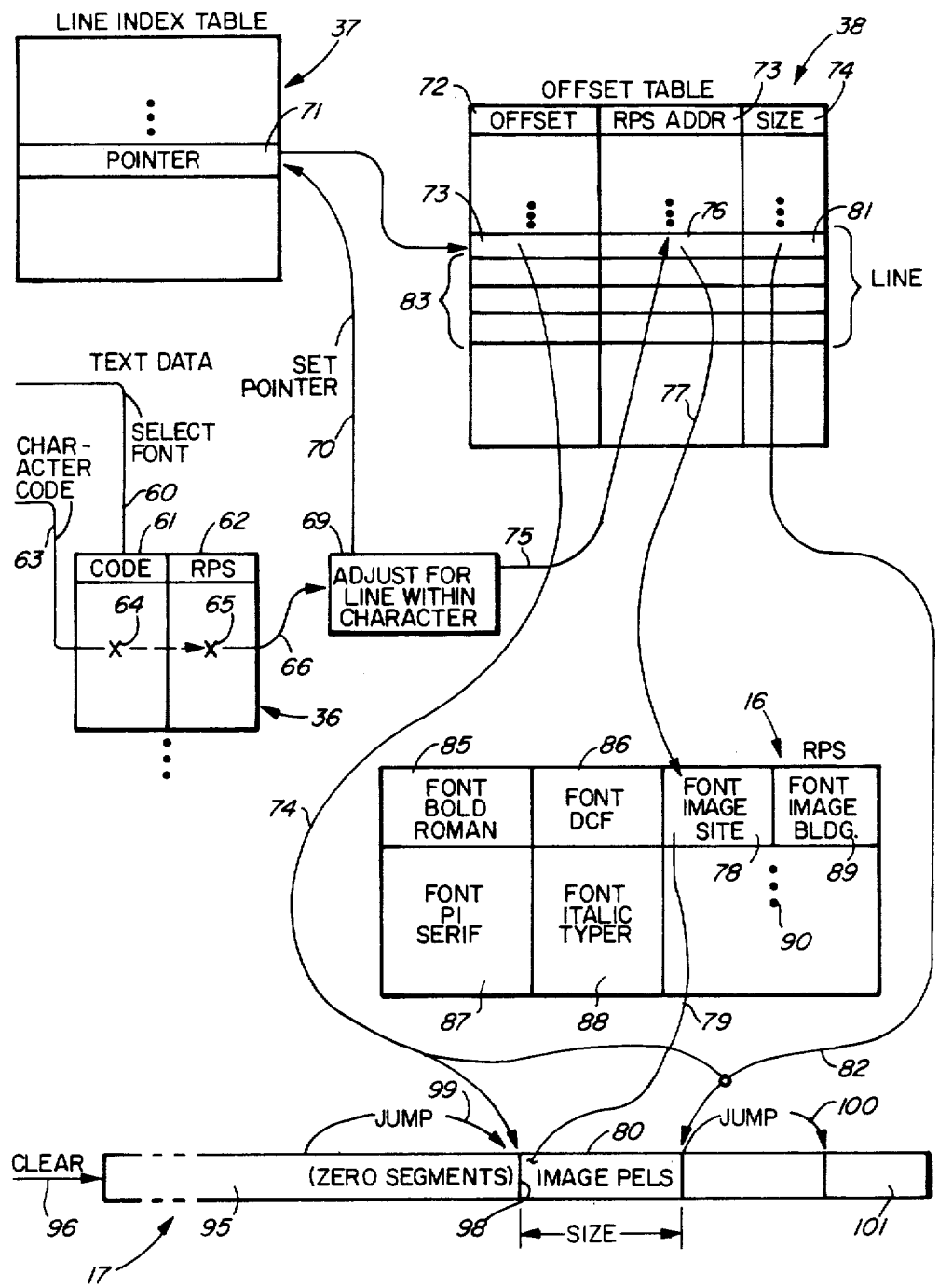
FIG. 2 is a logic diagram showing raster pattern handling in the FIG. 1 illustrated printing system.

Referring next to FIG. 2, the general addressing structure used in image presentation system 10 is described. Each compacted image raster pattern is stored within image presentation system 10 as if it were a font of symbol characters. Translate table TT 36 consists of a plurality of directories, one for each font to be used in a document presentation. The TT 36 applicable to a given font is activated or selected as indicated by numeral 60 and as explained in detail in the document incorporated by reference. One side of the translate table includes a listing of all valid coded information bit permutations, while a second portion 62 of the table contains the RPS relative addresses for the raster patterns used to create the symbol represented by the corresponding code permutations in area 61. The coded information is represented as being received by line 63 which identifies a code permutation X 64. Code permutation 64 correlates to RPS 16 relative address 65. This relative address 65 is manipulated as indicated by arrow 66 to adjust for lines within the characters as indicated by the function box 69. That is, if a five by seven array of pels were to be used for printing a character symbol, then seven lines of print, one for each horizontal line of pels in the character are required. Generally, the one line of pels is supplied at a time to the page raster unit 18, requiring, in the five by seven array, seven transmissions of pels for building a printed character. For each line of the pels, a pointer is set as indicated by numeral 70 within line index table 37. For a five by seven character, there is one entry in line index table 37. The relative position of entry 71 in line index table 37 corresponds spatially to the actual vertical print position on a sheet of paper which will carry the visual printed image.

Offset able 38 has three general sections. Section 72 indicates the offset of the pels identified in the RPS address (RPS ADDR) stored in section 73 from the left-hand margin of the line of pels. For purposes of simplicity, the offset table 38 shown in FIG. 2 contains only those entries for printing one line of pels of an image compacted in accordance with the present invention. Pointer 71 of line index table 37 points to offset area 73 in section 72 of OT 38. The offset value stored in offset area 73 points to a horizontal location in the line of pels to be printed as indicated by arrow 74. This location also corresponds to the storage location in the print or line buffer for the corresponding pel signals from RPS 16. The RPS address stored in RPS address area 76, as selected by arrow 75, of the page to be printed was established through the use of TT 36 and function 69 and points, as indicated by arrow 77, to font image 78 which, for purposes of illustration, is a diagram (not shown) of a site on which a building can be located. The identified pels stored in area 78 of RPS 16 are transferred as indicated by line 79 to area 80 of strip buffer 17. The number of pels to be transferred is indicated in a third section 74 of OT 38 in area 81, which indicates the number of pels to be transferred. Arrow 82 indicates the ultimate position of these pels within print buffer 17. From the offset value stored in first section 72 and the size value stored in third section 74, the location of the next symbol or other sets of pels is readily calculated. Numeral 83 indicates the additional identification in OT 38 of pels (not shown) to be included within a single line of pels.

RPS 16 not only stores the image-indicating signals in font image site 78 but also stores the raster patterns of characters of typographic fonts. Such character patterns can be a font termed BOLD ROMAN stored in area 85, font DCF stored in area 86, font PI SERIF stored in area 87, and font ITALIC TYPER stored in area 88. Additional images may also be stored as addressable "fonts", represented by the font "IMAGE BLDG" stored in area 89. Additional fonts and images are also stored in RPS 16 as indicated by ellipsis 90.

Strip or print buffer 17, upon transferring the signals stored therein for a line of pels, is automatically cleared by text decoder 15 as indicated by arrow 96. This means that all of the signal positions (not individually shown) in the print buffer then represent background pels. Accordingly, only foreground-pel-indicating signals need be loaded into the print buffer for creating a character symbol or an image.

The offset value stored in area 73 of OT 38 serves as a jump function 99 from the left margin such that all background pels will be printed in area 95 up to offset 98, whereat the area 80 begins. In a similar manner, area 101 may receive additional foreground pel signals with an effective jump, indicated by arrow 100, being effected through the offset and size areas of OT 38. It should be understood that all entries within OT 38 defining a print line of pels may be linked together through a singly-linked list (no shown).

Figure 3:
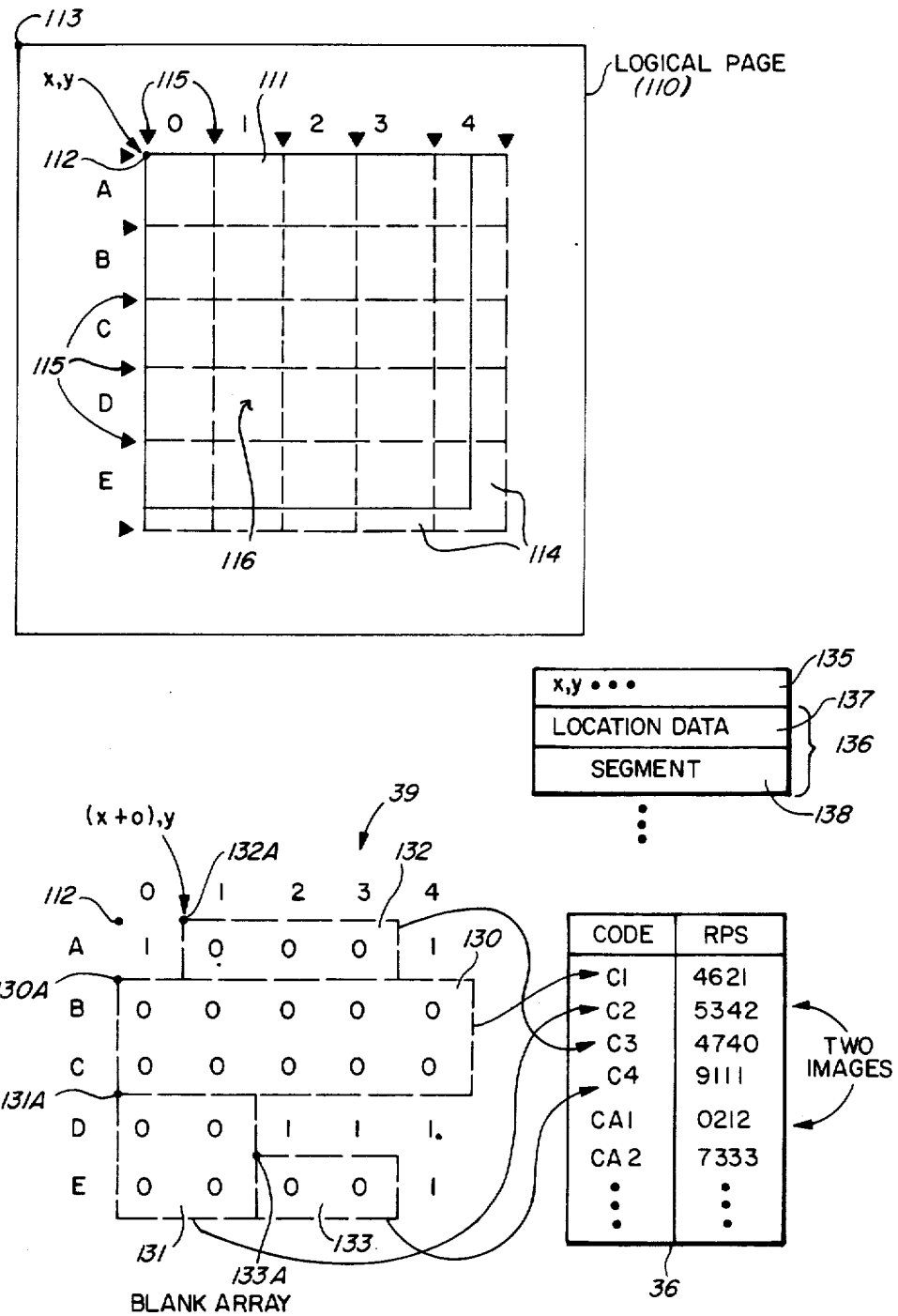
FIG. 3 diagrammatically illustrates segmenting an image using the logic of FIG. 2 for implementing the present invention.

FIG. 3 illustrates how the invention can be practiced with respect to text and image data to be printed within logically defined page 110. Logical page 110 identifies the size of the print area on a sheet of paper or CRT screen. By arbitrary convention, all locations for pels on logical page 110 are referenced from its upper left-hand corner 113. The horizontal dimension, as shown in FIG. 3, is arbitrarily defined as the X direction, while the vertical dimension is arbitrarily defined as the Y direction. Correspondingly, each defined area on logical page 110 is located by its upper left-hand corner, such as at 112 for an image to be processed having a location X, Y. All addresses within the image represented by the solid rectangular box 111 are defined with respect to the upper left-hand corner 112.

For purposes of compaction and use in a character addressable image-presentation device, in accordance with the present invention, the image to be presented is divided into a plurality of subarrays or segments of pel signals which are preferably square (the same number of pel signals on each dimension) and have a segment size represented by the caret marks 115. The segment dimensions are preferably selected in accordance with the electrical capabilities of electronic circuits controlling the image presentation device. For example, it is desired that each of the segments of the image be capable of containing at least one character symbol normally printed or presented by the device. In one embodiment, the segment size was 32 pels by 32 pels (four eight-bit bytes square having 128 8-bit bytes). The received image 111 is segmentable into a five by five array of segments, the horizontal dimensions being labeled 0–4 while the vertical dimensions are labeled A–E. The segment array need not be square. The image 111 has a dimension less than five times the segment size; accordingly, at border 114 sufficient background pels are added to the image to complete the five by five segment array, i.e., the image is always padded to fill an integral number of segments. For purposes of describing the addressability of the segments, each segment will be identified by the vertical ordinate followed by the horizontal ordinate. For example, segment number 116 is termed D1.

In accordance with the invention, those segments of the segment array containing the image to be compacted are grouped into addressable rectangular groups of segments with each segment having at least one foreground pel. In the method of compacting, it is preferred that the largest addressable groups be identified first. Then succeeding smaller rectangular groups or sets of segments are identified until all segments having at least one foreground pel signal are assigned to an addressable group to be stored in RPS 16 for being addressable similar to addressing fonts of symbol characters.

For programming efficiency, all of the segments are represented in a so-called blank array BA 39 detailed in FIG. 3 for image 111. A binary "1" indicates those segments containing all background pel signals. For example, segment A0 contains signals for all background pels. A binary "0" represents a segment containing at least one foreground pel signal; for example, segment A1 contains at least one foreground pel signal. A later-described scan and evaluation method automatically identifies the largest remaining rectangular group of contiguous segments containing at least one foreground pel for identification as an addressable entity in RPS 16. As shown in FIG. 3, the largest addressable group of rectangularly contiguous segments is group 130 containing ten foreground-containing segments in a rectangular group identified in the table 36 by code C1 and stored in RPS at beginning address 4621. Address 4621 identifies the location of pel 130A at the upper left-hand corner of the array of pels contained in the segments identified within group 130. The second largest rectangular array of foreground-pel-containing segments is represented by code C2 and in BA 39 as array 131 having an address 5342 for pel 131A. Similarly, C3 denotes group 132 addressable via the upper left-hand corner pel 132A at RPS address 4740. The fourth group 133 contains but two segments identified by code C4 and stored at RPS pel 133A address 9111. The details for efficiently identifying the foreground-pel-containing segments for rectangular groups storage for compacting an image will become apparent from FIGS. 4 through 7, inclusive.

The storage of compacted images not only includes the pel arrays 130–133 but also includes control information, such as the actual XY location on the logical page as stored in section 135 (FIG. 3). It may also include other control information not pertinent to an understanding of the present invention. Such control is information is preferably in working store 14, althrough it can be stored in RPS 16. Each addressable entity of segment groups of the compacted image is started as a unit 136. Each unit 136 includes location data 137 (stored in working store 14) corresponding to the location of pel 130A which is relative to the XY location 112 of the compacted image. The actual segment pel patterns are stored at 138 in RPS 16. Storage of segment group 130 includes those pel patterns for all ten of its segments, while storage of segment group 133 includes only those pel patterns for its two segments.

Figure 4:
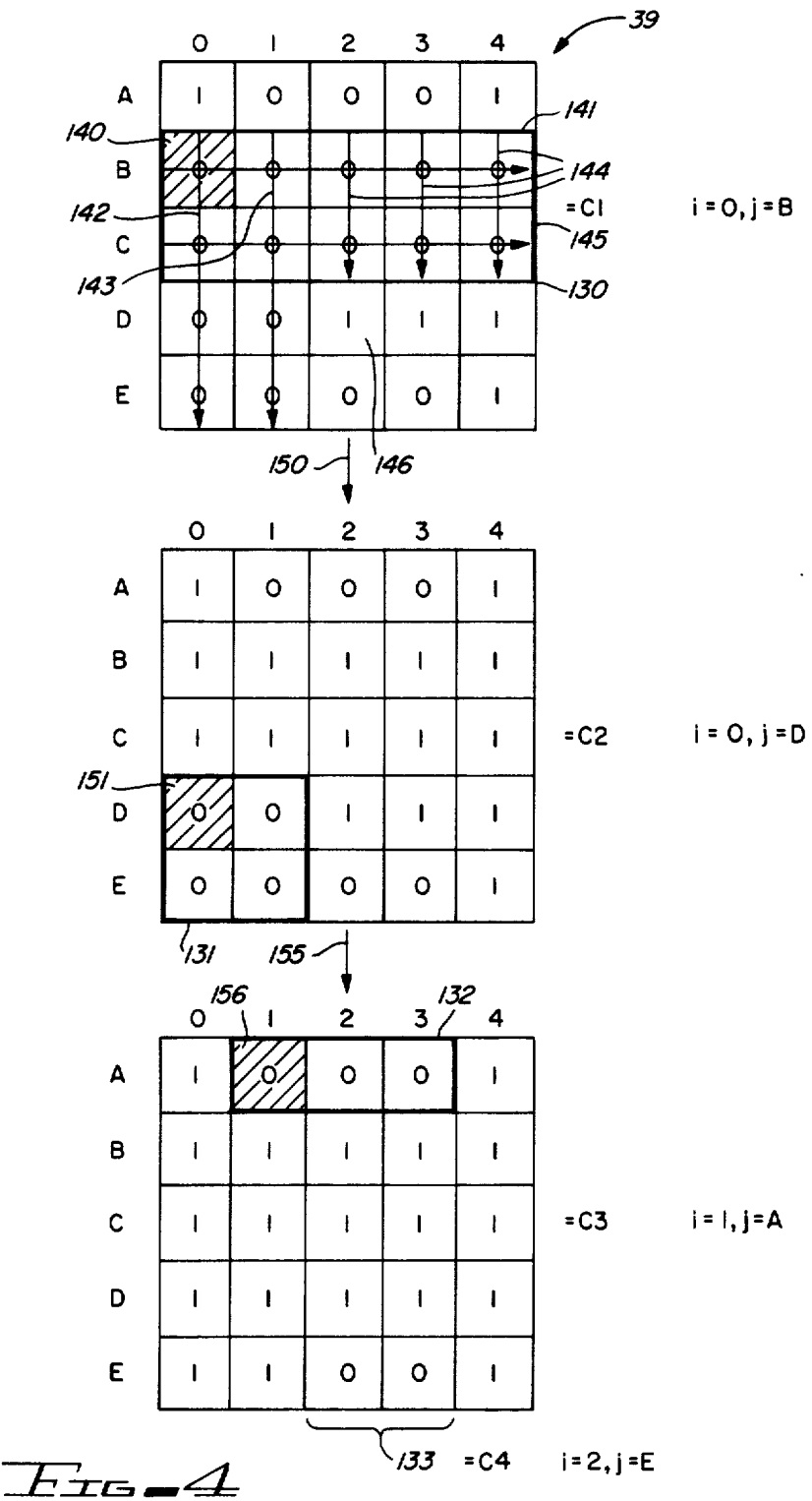
FIG. 4 diagrammatically illustrates a sequence of operations for performing the compaction illustrated in FIG. 3.

Each table 36 can contain identification of more than one compacted image. For example, codes CA1, CA2, etc., respectively identify storage of an additional independent compacted image to be presented. FIG. 4 gives an overview of the segment analysis method based upon examination and processing of the image representations stored in BA 39. The original bit pattern of BA 39 for image 111 is shown at the top of the Figure. The largest segment 130 is identified by a so-caled anchor segment 140 at B0. Processing within the program converts the X dimension to i and the Y dimension to j. This nomenclature is used in the subsequent description of the program implementation. The hatched anchor segment 140 is the anchor for scanning the blank array 39. Arrow 142 indicates that the first scan is a vertical scan along the i=0 value terminating at the lower extremity of the array at row E. The second scan, represented by arrow 143, is also a vertical scan in row 1 and extends to the lower extremity of the array at row E. The first two scans 142 and 143 identify a rectangular array of eight foreground-pel-containing segments. The third scan 144, in column 2, is terminated at row C because segment D2 also identified by numeral 146, stops the scan, i.e., segment 146 contains all 0s. The scan 144 indicates that the scanned segments cannot be contained within a single rectangular array, accordingly, the method computes and stores the scan as completed at bottom of column 1 as a first rectangular array of foreground-pel-containing segments. The subsequent scans in columns 3 and 4 also are two segments deep. The arrangement is such that the scans of rows 0-4 for the two high segment scans define a second rectangular array of foreground-pel-containing segments. Since the rectangle defined by segments B0, B4, C0, C4 contains ten segments whereas the rectangle of segments identified by B0, B1, E0 and E1 contains eight segments, the horizontally aligned or first-mentioned rectangular array of segments is closesn as the largest array of segments to be stored in RPS 16 having an i value of zero (column 0) and a j value of B (row B). Upon storing the just-selected largest rectangular array of foreground-pel-containing segments, all of those segments are indicated in the blank array aray BA 39 by a binary one, i.e., since the segmnets are stored, they are connected as being blank as the need for restoring such segments no longer exists. The machine processing continues as indicated by arrow 150 to find the largest remaining rectangular array of foreground-pel-containing segments.

The rectangular array for yielding character group C2 is next identified as rectangular array 131 using the procedure described above. The anchor segment 151 for the largest remaining rectangular array that is first found in the scan consists of segments D0, D1, E0 and E1. It should be noted that a second rectangular array in row E and residing in columns 0-3, inclusive, is the same as the selected segment group. The first and largest detected remaining rectangular array of foreground-pel-containing segments is the one selected. The process continues as indicated by arrow 155 with the BA 39 representations of the segments D0-E1 then being set to 1s.

The third addressable rectangular group of foreground-pel-containing segments 132 is identified by character C3 and has location i=1 and j=A. Anchor segment 156 defines a rectangular array of three segments which is stored as an addressable unit C3. Then BA 39 has its three areas corresponding to array 132 set to ones. The last group of segments 133 is addressable through character C4 and identified as i=2 and j=E. As will become apparent, the scanning for all of the groups follows the same general procedure. Examination of a segment that is to be an anchor segment having a binary one in BA 39 aborts a group-defining scan such that, as the groups of foreground-pel-containing segments are stored, the array scanning becomes shorter and shorter.

Figure 5:
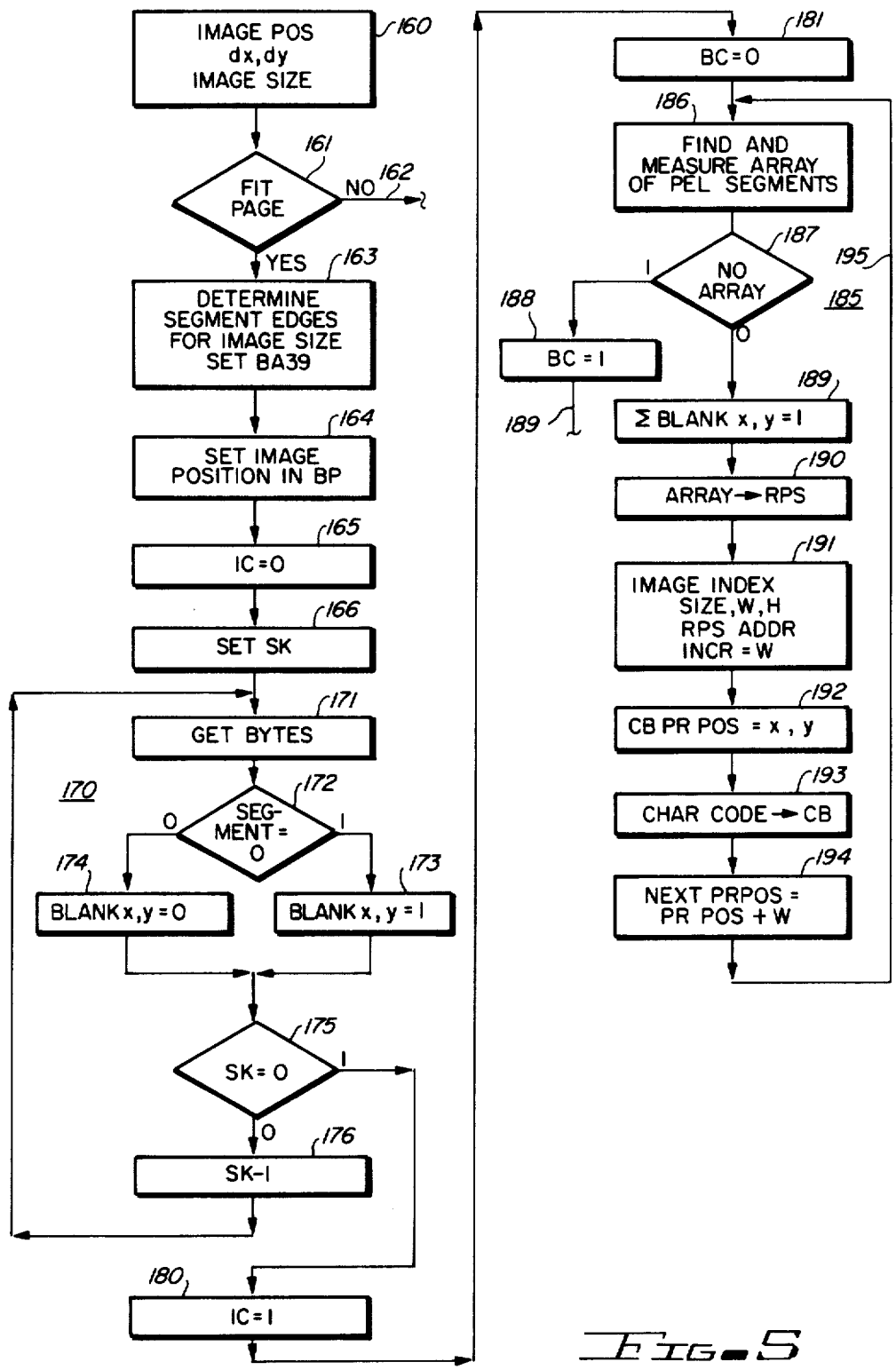
FIG. 5 is a flowchart of the overall machine operations for implementing the invention in the FIG. 1 illustrated printing system.

FIG. 5 shows the general flow of machine processing which identifies the succession of diminishing-size largest remaining groups of foreground-pel-containing segments. The chart of machine operations assumes that the digital signal raster pattern representing the image has been received in working store 14 working buffer portion WB 35. The received raster pattern includes location-data-identifying point 112 (FIG. 3) on the logical page 110. At step 160 digital processor 13 analyzes the received raster pattern, i.e., it computes the X and Y coordinates in terms of pels and determines the location 112. At step 161 digital processor 13 determines whether or not the received raster pattern for the image will be printable within the confines of logical page 110. If the received raster pattern represents an image which exceeds any boundaries if logical page 110, because of either its size or its location on the logical page, then digital processor 13 follows logic path 162 to perform image processing functions beyond the scope of the present description. Assuming that the received raster pattern is printable within logical page 110, digital processor 13 at step 163 determines the segment edges for the image. That is, digital processor 13 converts the X and Y dimensions of the received image into an integral number of segments by dividing the pel number for each coordinate by the pel size of the segment and rounding to the next larger (set BA 39) integer. These integer values are the XMAX and YMAX values stored in areas 42 and 43. Then data storage space for BA 39 is allocated within working store 14 such that it has a digital array of bits equal to the number of segments defined in the measurements of the image, such as shown in FIG. 3. At step 164 the location of the image (point 112) is set in the buffered page BP 31 which is to receive the image. At this point in time, the text material for the logical page 110 associated with the image being processed may have not yet been received by the image presentation device. In any event, the received raster pattern will have an identification used to address the image as stored in RPS 16 through the table 36. At step 165 digital processor 13 sets internal control bit IC to 0. IC=0 indicates that BA 39 will be filled with zeros and ones in accordance with the general content of the segments, i.e., whether the segments are entirely background or contain at least one foreground pel. At step 166 the segment count SK is set to the number of segments determined at step 163. SK is the product of the number of segments along the horizontal coordinate and the number of segments along the vertical coordinate; for image 111, this calculation is 5 times 5, yielding 25 bit positions. The allocation is for five bytes of storage.

Loop 170 contains the machine processing for generating the blank array in BA 39 corresponding to the received raster pattern, i.e., digital processor 13 sets the individual bits of BA 39 to one or zero, depending on whether or not a corresponding segment contains all background or some foreground pels. At step 171 all of the bytes for a given segment are accessed beginning with the upper left-hand corner bytes and proceeding to the right-hand boundaries and then repeating for the next row. At step 172 digital processor 13 determines whether or not all bits in the segment being scanned are zeros, i.e., all background pels. If the segment is all zeros, then at step 173 the bit in BA 39 at address X,Y in accordance with the spatial location of the segment being scanned is set to unity. Otherwise at step 172, upon detecting a first foreground-pel signal, the segment contains at least one foreground pel, resulting in digital processor 13 at step 174 setting the corresponding bit in BA 39 to zero. At step 175 the segment count is examined to see if it is zero. If it is not zero, then further segments have to be evaluated. The segment count is decremented at step 176 by unity, and steps 171-175 are then repeated until zero is detected at step 175. Then at step 180, the internal flag IC is set to unity, signifying that BA 39 has been built.

Each segment is preferably an integral number of data bytes in dimension. For example, in one embodiment the segment was 32 pels by 32 pels corresponding to four bytes wide and four bytes high. This segment size results in 128 bytes of data in each segment. Keeping the segment boundaries on byte boundaries simplifies machine processing. The next step of machine operations identifies and stores the rectangular groups of foreground-pel-containing segments, as described with respect to FIG. 4. First, at step 181 an internal flag BC is set to zero for signifying that the arrays are being relocated. The combination of IC=1 and BC=0 signifies the set of machine operations being executed in loop 185.

Loop 185 finds digital processor 13 at step 186 identifying the largest remaining rectangular group of foreground-pel-containing segments in the raster pattern being processed. The details of this identification and location process are described later with respect to FIGS. 6 and 7. Upon identification of the largest remaining rectangular group of foreground-pel-containing segments, digital processor 13 at step 187 determines whether or not such a group has been identified. If not, then all of the segments have been successfully processed, including storage of the rectangular group in RPS 16. Then at step 188, BC is set to unity for indicating completion of the compaction process. Then at step 189, digital processor 13 proceeds to do other text and image-related machine operations.

If a group was identified at step 187, then at step 189 digital processor 13 accesses BA 39 and sets to unity all of the digits in BA 39 corresponding to the segments of the just-identified rectangular group of foreground-pel-containing segments, to unity, i.e., effectively indicating that further compaction processing of such segments is not necessary. At step 190 the rectangular array of foreground-pel-containing segments is in fact stored in RPS 16. At step 191 the image index system shown in FIG. 2 is updated as to size, width and height, and the RPS address (in section 62) is updated. This action establishes the RPS addressability of the just-stored rectangular group. At step 192 the XY location of the just-defined group within the image 111 area is stored in RPS 16 along with the group of raster pattern segments. The term CB means "character buffer" of RPS 16 and PR means "print," while POS means "position." For example, as seen in FIG. 4 for the C1 identified group, the upper left-hand corner of anchor segment B0 is the XY location of that rectangular group. At step 193 the character code C1 for the first rectangular array is stored in the table 36 along with the entry 4621, the appropriate RPS address. This XY location is the initial print position (PR POS). At step 194 the next print position, i.e., the right-hand boundary of the just-identified rectangular group, is calculated as the print position corresponding to the anchor segment B0 plus the width of the rectangular group expressed in the number of horizontal segments. For group 130, there are five segments in the width. Also at step 191, the width value of five segments is recorded in working store 14 with the raster pattern signals being stored in RPS 16. Then digital processor 13 proceeds to repeat steps 186-194 until no further foreground pel groups are identified, i.e., BA 39 contains all ones.

Figure 6:
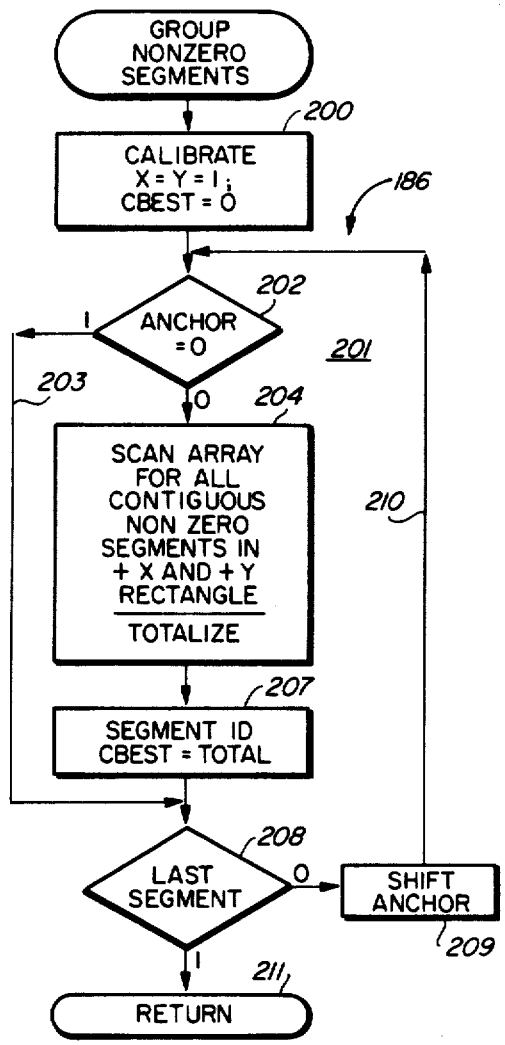
FIG. 6 is a flowchart illustrating the identification of the segments in an image to be compacted which will be stored in a raster pattern memory.
Figure 7:
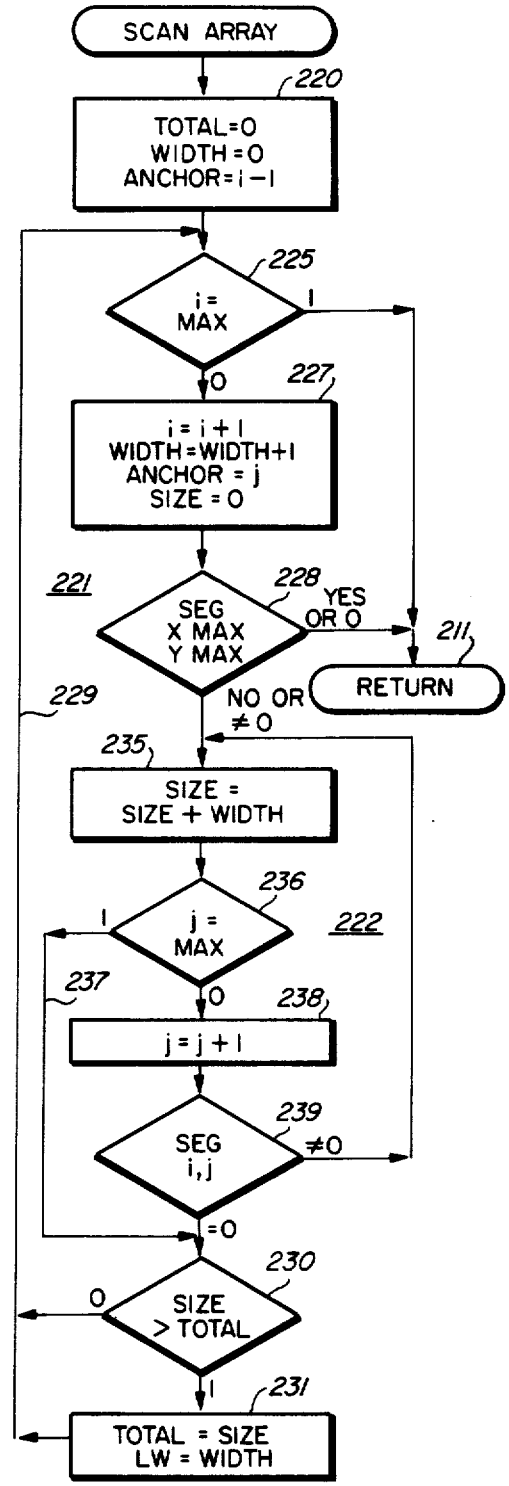
FIG. 7 is a flowchart illustrating the detailed machine operations for identifying a large group of segments remaining in an image to be compacted and which can be stored as an addressable rectangular array of segments.

FIG. 6 illustrates machine operations employed for sequencing the FIG. 7 illustrated scanning of the raster pattern segments to identify a largest remaining rectangular group of segments, each segment of which contains a foreground pel. At step 200 digital processor 13 calibrates machine operations by setting the values X and Y to unity and a value CBEST to zero which will identify the largest remaining rectangular group of foreground-pel-containing segments. A machine operations loop 201 sequences the scans of all the segments in such a manner that each and every segment in the array of segments for the raster pattern being processed is examined as an anchor segment, as will become more apparent from the FIG. 7 scan for one anchor. The first step 202 analyzes the bit value of an anchor segment as represented in BA 39. Returning to FIG. 3, the first segment in the scan is A0. It has a binary one in BA 39, indicating that the anchor has all zeros or that the segment has already been processed and stored in RPS 16. If that is the case at 202, digital processor 13 follows logic path 203 to reinstitute the anchor scan, as later described. For each and every foreground-pel-containing segment (BA 39 bits representing the segment equals zero), at step 204 and as detailed in FIG. 7, digital processor 13 scans BA 39 (as described generally with respect to FIGS. 3 and 4) for identifying the largest contiguous remaining rectangular group of nonzero or foreground-pel-containing segments as well as the location and identification of all such contiguous segments. At step 207 segment identification of the anchor is set in XY dimensions within the raster pattern array for the image being processed, and The value CBEST is equal to the total number of segments within the current rectangular group of segments. At step 208 digital processor 13, from either logic path 203 or step 207, determines whether or not the last segment in the image array of segments has been processed. If not, the anchor is shifted at step 209 such that the scan can be repeated for another anchor. Returning momentarily to FIG. 4, an anchor shift corresponds to first scanning segment A0, then shifting to segment A1 and so forth through A4. Then the next row is scanned beginning at B0 and so forth.

The details of executing the machine operations shown in step 204 of FIG. 6 are detailed in FIG. 7. In FIG. 7 a step 220, digital processor 13 sets the value TOTAL equal to zero, the width equal to zero, and the anchor equal to i-1. The value "i-1" corresponds to a virtual segment to the left of segment A0. This calibration is necessary since the value i is incremented before the scanning operation. Loop 221 includes all of the machine operations for scanning the raster patterns of the image 111, including using each and every foreground pel segment as an anchor segment. At step 225 digital processor 13 compares the value of i with its maximum value. In the illustration, since there is a width of five segments, maximum value is five. This indicates the completion of the scan and allows return at step 211 to the FIG. 5 illustrated set of machine operations. If the value of i is less than maximum, then at step 227 digital processor 13 increments i by unity and increments the width by unity (the width is measured in terms of the number of contiguous segments in a row containing a foreground pel). Since the initial value of width is zero, the initial incrementation at step 227 gives a width of one, i.e., the anchor segment. The anchor value is set to j; j also equals zero. At step 228 digital processor 13 determines whether or not the segment ij (maximum), which corresponds to the lower right-hand segment of FIG. 4, is equal to zero. If this segment is equal to zero, the scan has been completed. If the segment is not XMAX, YMAX, or if XMAX, YMAX is not equal to zero, digital processor 13 then performs the vertical scan represented by the machine operations of loop 222. At step 235 the size of the current rectangular group of foreground-pel-containing segments is calculated. This size is equal to the current size plus the current width, i.e., each vertical scan computes the rectangular size of segments scanned in a given rectangular group being identified. Then at step 236 the value of j is compared with the maximum value YMAX. If it is the maximum value, the vertical scan has been completed for a given column. Accordingly, logic path 237 leads digital processor 13 to step 230 wherein the size calculated at step 235 is compared with TOTAL, i.e., the number of segments contained in rectangular group of segments that were previously scanned. If the new size is greater than the previous size, then at step 231 the TOTAL value is equal to the size calculated at step 235, and the longest width is equal to the current width value. Returning to FIG. 4, beginning with anchor segment B0 the vertical scan represented by arrow 142, after progressing through later-described loop 222, has a size equal to four segments. A prior rectangular group using segment A1 as an anchor identified nine segments (A1-C3) as being a previous TOTAL. Therefore, the first scan from B0 results in no alteration at step 231, digital processor 13 leaving step 230 via logic path 229 to repeat steps 225, etc. Returning now to step 236, before the vertical scan reaches the bottom of the image, as represented by j=MAX, at step 238 digital processor 13 increments the value of j by unity. If the segment being scanned is not zero (contains a foreground-indicating pel), then steps 235 through 239 are repeated until a zero-indicated segment is identified or the bottom of the scan is reached. For example, step 239 detecting an all-background-pel segment (BA 39 bit=1) includes terminating the scan, as a segment 146 of FIG. 4.

Returning to step 235, the width value affects the areal computation; that is, as shown in FIG. 4, first scan beginning in anchor segment B0 has a width of unity. When segment E0 is scanned the total group size value is four. Then the following step 227 width is made equal to two. Upon completion, the size value is reset to zero at step 227. Upon the first pass through loop 222, the value width of two is made equal to size, which corresponds to segments B0 and B1. Subsequent iterations calculate the area by successive additions of the width value.

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of processing image-representing signals consisting of an array of binary digital signals wherein a first binary digital signal represents a background image pel and a second binary digital signal represents a foreground image pel;
including the automatic steps of:
dividing said array of binary signals into segments wherein each segment is a subarray of said binary signals having a size relatable to predetermined image-presenting characteristics of a machine which is to present the represented image;
examining all segments in the array for identifying those segments having one or more of said second binary signals;
grouping the identified segments into rectangular groups of segments and assigning a name to each group along with an identification of the logical position of the group of segments within said array;
storing said groups of segments as addressable units in a data storage device;
receiving a command to present the image represented by said array of digital signals; and
visually presenting said image in accordance with said received command by accessing said stored segments from said data-storage device and visually presenting same as said image in a relative or logical position indicated by said identification of logical position with respect to an array of background pels generated independently of said stored segments as an array of pels having an array size in accordance with said array of binary digital signals.

2. The machine-implemented method set forth in claim 1, further including the steps of:
scanning all of said segments in said array for identifying a largest one of said rectangular groups not stored in said data storage device of said second signal containing segments and storing said identified rectangular group as an addressable entity;
indicating those segments in said identified and stored group of segments that have been stored in said data storage device; and
repeating said scanning, storing and indicating steps until a scan of all said segments in said array indicates no segments remain to be processed and that all of said foreground-pel-containing segments are stored in said data storage device.

3. The machine-implemented method set forth in claim 2, further including the steps of:
before doing said scanning and indicating steps, scanning all of the segments for said second digital signals and creating a bit array corresponding to said segments containing nonzero-indicating binary signals respectively indicating whether or not a corresponding segment contains a second digital signal, all of said segments not containing a second digital signal before indicated in said bit array as a segment not to be processed and the first-mentioned indicating step setting the bits in said bit array to a not-to-be processed state.

4. The machine-implemented method set forth in claim 1, wherein said grouping step includes the following steps:
first identifying and storing a largest one of said rectangular groups of said segments containing at least one of said second digital signals and assigning an address to said group;
then identifying and storing successively smaller but largest remaining groups of said segments containing at least one of said second digital signals and assigning an address to each of said identified groups; and indicating and storing said last-mentioned indication of the location of each said group of segments within said array.

5. The machine-implemented method set forth in claim 1, wherein said grouping step includes the following steps:

identifying and storing successively scanned largest remaining groups of segments containing at least one of said second digital signals by repeatedly scanning said segments from each of said segments being an anchor segments, said scanning always proceeding from said anchor segment in a first horizontal direction and in a first vertical direction such that up to two rectangular groups may be identified for each of said segments;

during each scan from each of said segments, summing the number of contiguous segments found in said vertical and horizontal scans that contain at least one of said second digital signals, selecting the group of segments having a greatest total of segments as the largest remaining group of segments, storing said segments in said largest remaining group as an addressable entity, and marking all segments in the array that were stored as background segments; and repeating said scanning until all segments in said array are marked as background segments.

6. The machine-implemented method of digitally processing image data signals received as a raster array of 0 and 1 bit signals wherein the image is represented by the pattern of 1s and 0s in the array, the array being addressable by horizontal and vertical coordinates, each bit signal being separately identifiable in said array;

including the machine-executing steps of:

dividing said array of bit signals into segments of said bit signals such that each segment is separately addressable;

scanning the array for identifying each non zero segment and grouping successively scanned non zero segments, irrespective of nonzero informational content of such nonzero segments, into segment groups with each segment group having a predetermined maximal number of segments and possibly less than said maximal number of segments;

identifying each group of segments by the horizontal and vertical coordinate of the first scanned bit (whether 0 or 1) in the first segment scanned of each group and storing an index to all segments using said identifying group coordinates;

processing said array by processing said identified groups; and reconstructing said array from said groups of segments and visually presenting said image based upon said reconstructed segment.

7. The machine-implemented method set forth in claim 6, further including the steps of:

before said scanning step, creating a bit array having one bit position for each of said segments and located in the bit array in a corresponding position to the position in said array of segments that a corresponding segment is located;

setting the bits of said bit array in accordance with whether or not a corresponding segment contains a foreground pel indicating signal;

scanning said segments by scanning said bit array, and upon identifying any rectangular group of contiguous foreground pel containing segments and storing same as an addressable entity, changing said bit array to reflect that the identified and stored segments are background-only segments; and repeating said steps until all foreground pel containing segments are stored as a part of an addressable group of said segments.

8. In a machine-implemented method of compacting image data consisting of an array of binary signals with each said binary signal representing a pel of the image as presentable in a raster of pels, a first binary signal representing a background pel and a second binary signal representing a foreground pel;

the improvement including the machine-executable steps of:

dividing said array of binary signals into segments which are subintegral rectangular arrays of binary signals of the binary signal array;

iteratively performing the following steps (A) through (E) until all of said segments having at least one of said second binary have been identified with an address, each segment having a second binary signal being a foreground segment;

(A) for each of said foreground segments, identifying all contiguous foreground segments in a first orthogonal direction and in a second orthogonal direction for identifying all such contiguous foreground segments which are also contiguous to the contiguous foreground segments in a first orthogonal direction;

(B) totalizing the number of said foreground segments identified in the immediately preceding step (A);

(C) repeating steps (A) and (B) until all possible rectangular groups of such contiguous segments are identified;

(D) finding a rectangular group having a largest number of said foreground segments are assigning an address to such group;

(E) creating an indication that all of said foreground groups in said largest group identified in the immediately preceding step (D) are now not foreground segments;

storing in an addressable data storage unit at addressable data storage locations all of said groups of identified foreground groups with an indication of the logical location thereof in said array of binary signals as compacted representation of said image; and creating and storing a table containing all of said assigned addresses and the respective stored locations of said groups of foreground segments whereby said image can be machine decompacted by machine addressing said groups of stored foreground segments via said table.

9. In visual-image-producing apparatus adapted to store digital signals representing the image to be presented as an array of binary signals wherein a first binary signal represents an image background pel and a second binary signal represents an image foreground pel in identical spatial relations as pels of the visual image;

the improvement, including in combination:

size means for electrically indicating the size of the image to be presented as the number of said pels in an array corresponding to said array of binary signals;

segment means for electrically indicating segments of said binary signal array, each of said segments being a subarray of said binary signals which is a subintegral of the array of binary signals;

blank means for electrically indicating which of said segments contain at least one of said second binary signals;

storage means coupled to said size means, said segment means and said blank means for storing all of said segments including at least one of said second binary signals and none of said segments not containing said at least one of said second binary signals and including directory means for indicating the array position of said stored segments; and image presenting means coupled to said storage means and said directory means for accessing said storage means to obtain said stored segments and for presenting such accessed segments as a part of said image and presenting background pels in all segment areas of the image array corresponding to segments of said image to be presented but not stored.

10. The apparatus set forth in claim 9, further including:

data storage means for storing digital signals representing a local page of text and graphics; and means coupled to said data storage means and said first-mentioned storage means for indicating the location on said logical page the image to be presented and for storing said location indication in said first-mentioned storage means adjacent said stored segments.

11. In an image-presentation device having visual-image-presenting means for generating a visual likeness of an image as a raster of pels in a rectangular array; said image being represented by a like-sized array of digital signals wherein each said digital signal represents one pel;

the improvement including in combination:

data storage means for storing a compacted digital signal representation of an image to be presented as a plurality of segments of the array wherein each stored segment includes at least one digital signal representing at least one foreground pel of the image and any segment including background pel indicating digital signals only not being stored therein; each said segment having a rectangular subarray of digital signals for representing pels of said image to be presented; said segments being stored as rectangular groups of contiguous segments each one of said contiguous segments including said at least one digital signal;

directory means in said data storage means for indicating the data storage address of said stored rectangular groups and storing an identified spatial location of each said rectangular groups in said rectangular array, respectively; and presenting control means coupled to said directory means, said data storage means and said visual-image-presenting means for building a visual image by accessing said stored segments and overlaying same onto a visual array of background pels equal in size to said rectangular array at spatial locations indicated by the respective identified spatial locations.

12. In a printer of the all-points-addressable raster type having the elements of a channel adapter, a digital processor, a working store having a plurality of addressable registers which are allocatable for program-defined data storage, a text decoder, a raster pattern store, a print buffer and a page raster unit for visually presenting images received as raster patterns from said raster pattern store or said working store, means intercoupling all of the above-recited elements and programs is said working store for enabling the digital processor to operate the elements in a coordinated manner for printing the image;

the improvement including, in combination:

a line index table in said working store for addressably relating lines of said raster to predetermined data storage areas of said working store;

an offset table in said working store occupying said predetermined data storage areas and in each of said predetermined data storage areas storing a line offset for data to be printed, a number of data units to be printed and an address of said raster pattern store which stores such data units to be printed, and means linking said predetermined data storage areas for each line in said line index table;

a blank array in said working store having a plurality of addressable bit positions each for storing a first binary signal for signifying that a corresponding data segment has all background-indicating signals and a second binary signal for signifying that a corresponding data segment includes at least one foreground-indicating signal;

first program means stored in said working store for enabling said digital processor to operate said elements to receive a rectangular array of raster digital signals and for dividing said raster digital into segments, each of said segments having a given number of said raster digital signals and for relating each of said segments to a respective one of said blank array bits to become a corresponding segment thereof;

second program means in said working store for enabling said digital processor to scan each of said received segments and for setting the related blank array bit to store a first or a second binary signal in accordance with each such segment containing all background data signals or including at least one foreground datum signal;

third program means in said working store for enabling said digital processor to identify all of said segments in said line index table and said offset table that contain said at least one foreground datum signal and for storing such segments in said raster pattern store as addressable characters; and fourth program means in said working store for enabling said digital processor to print said received rectangular array of raster signals by said coordinated operation by supplying said stored segments to said print buffer at offsets indicated by said offset table.

13. The printer set forth in claim 12, wherein said third program means includes scanning program means for enabling said processor to:

identify all contiguous foreground indicating signals in a plurality of rectangular arrays of such indicating signals in said blank array and select a rectangular array of said contiguous signals containing the largest number of such indicating signals, store said segments corresponding to said indicating signals in said largest rectangular array and resetting the rectangular array of indicating signals to indicate background segments; and to repeat said identifying and scanning until all of said indicating signals in said blank array indicate background segments.

* * * * *